United States Patent [19]

van Ass

[11] 4,242,117
[45] Dec. 30, 1980

[54] METHOD OF PRODUCING OPTICAL FIBERS FOR TELECOMMUNICATIONS

[75] Inventor: Henricus M. J. M. van Ass, Hillegom, Netherlands

[73] Assignee: U.S. Philips Corporation, New York, N.Y.

[21] Appl. No.: 973,277

[22] Filed: Dec. 26, 1978

[30] Foreign Application Priority Data

Jan. 6, 1978 [NL] Netherlands ............... 7800157

[51] Int. Cl.³ ............... G02B 5/14; C03C 25/02
[52] U.S. Cl. ............... 65/3 A; 65/2; 65/30 E; 350/96.31; 350/96.34
[58] Field of Search ............... 350/96.31, 96.34; 65/2, 65/3 R, 3 A, 30 E, 47 Q; 106/52, 54

[56] References Cited

U.S. PATENT DOCUMENTS

| 3,858,964 | 1/1975 | Piesslinger et al. | 350/96.34 |
| 3,877,783 | 4/1975 | Matsumura et al. | 350/96.31 |
| 3,941,474 | 3/1976 | Kitano et al. | 350/96.31 |
| 4,094,689 | 6/1978 | van Ass et al. | 350/96.31 |

OTHER PUBLICATIONS

J. P. Lacharme article in *Silicates Industriels* 1976-3, pp. 169-175.

French et al., "Refractive Index Changes Produced in Glass by Ion Exchange" in *Ceramic Bulletin* vol. 49, No. 11, Nov. 1970.

*Primary Examiner*—Stewart J. Levy
*Attorney, Agent, or Firm*—Marc D. Schecter

[57] ABSTRACT

When producing a glass fiber, having a graded refractive index profile, by means of the double crucible method, the initial materials being core and cladding glass compositions having mutually different alkali ions, a profile is usually obtained which greatly deviates from the desired parabolic form. The invention furnishes the possibility of approximating this parabolic form very closely. This is attained by a partial substitution of the core alkali ion by the cladding alkali ion.

4 Claims, 3 Drawing Figures

METHOD OF PRODUCING OPTICAL FIBERS FOR TELECOMMUNICATIONS

BACKGROUND OF THE INVENTION

The invention relates to a method of producing optical fibers for telecommunication purposes, the fibers thus obtained and the cables constructed thereof.

For producing such fibers U.S. Pat. No. 3,941,474 describes a method in which two glasses, which differ from one another in the cation oxides incorporated therein, are melted in a double crucible with coaxial nozzle openings at the bottoms of an inner and an outer crucible. The core glass of the fiber has the highest refractive index and the cladding glass the lowest. If no diffusion would occur a fiber having a stepped refractive index profile would be obtained. Depending on the temperature prevailing in the interface region, the time the glass remains in this region, the diffusion behavior of the cation components of the two glasses, and the contributions to the refractive indices, the stepped refractive index profile will diffuse out to a graded profile. Such a profile is desired because it decreases the pulse dispersion in multimode fibers. Calculations have proven that this profile must be approximately parabolic to furnish a minimal mode dispersion.

A drawback of this known method for obtaining a fiber profile is that the shape of the refractive index profile ultimately obtained after diffusion does not sufficiently resemble the desired parabolic shape. It is known that the shape of a profile obtained by diffusion with a diffusion coefficient which is independent of location is characterized by a concentration decay (a so called diffusion tail) which varies slowly with an increasing radius. It is indeed possible to somewhat correct the profile shape by varying the amount of the diffusion at the core-cladding interface but this cannot sufficiently eliminate the deviation from the parabolic shape of the profile, especially at extremities. The only possibility, for eliminating the deviation, seems to be in finding a different diffusion behavior in which the diffusion depends on location owing to the dependence on concentration and/or temperature, and, consequently, proceeds in the desired manner. The glasses used for producing fibers in accordance with the double crucible method consist of four or more components and must satisfy a plurality of physical requirements to enable a successful processing into fibers. Finding empirically the compositions which satisfy all requirements, including the desired diffusion behavior, is a time consuming method, the success of which cannot be definitely predicted.

SUMMARY OF THE INVENTION

The invention furnishes a method in accordance with which it is possible to modify glasses, which are unsuitable as regards their mutual diffusion behavior, so that a pair of compositions is obtained having such a mutual diffusion that a parabolic variation of the refractive index is approximately obtained.

The method of producing an alkali metal oxide containing glass fiber having a graded refractive index profile by means of a diffusion process between a core and a cladding glass, the glasses differing from one another in the nature of the alkali ion is, according to the invention, characterized in that in the initial core glass composition part of the alkali ions are equimolarly replaced by the cladding glass alkali ions to that extent that owing to the consequently modified diffusion behavior of the two alkali ions a substantially parabolic form of the refractive index profile is obtained.

The invention utilizes the so called "mixed alkali effect" which is known per se and described, for example, in an article by J. P. Lacharme entitled *Mechanisme de diffusion des ions Na+ et K+ dans les verres mixtes de silicates* in "Silicates Industriels" 1976-3, pp 169–175. It appears that in a mixed alkali-silicate glass the diffusion constants of mobile $Na^+$ and $K^+$ ions are independent of the concentration ratio of the alkali ions.

The invention will now be further explained with reference to FIGS. 1, 2 and 3 of the accompanying drawing.

DESCRIPTION OF THE PREFERRED EMBODIMENTS

Figure 1:
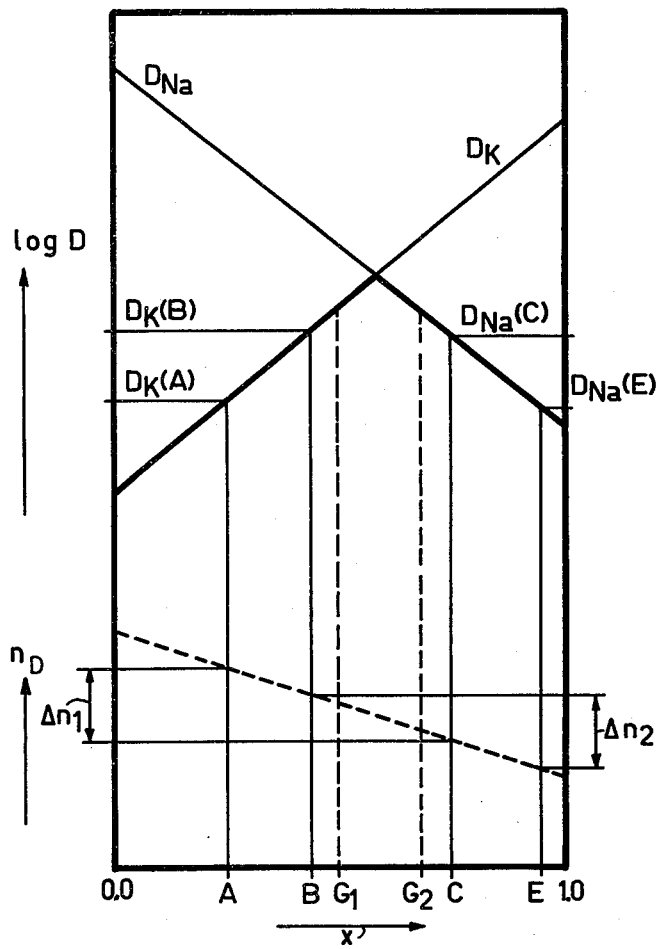
FIG. 1 shows a graph in which log D (D=the diffusion constant) and $n_D$ (the refractive index for light of the wavelength corresponding to the D-line in the Na spectrum) are shown as a function of x of a plurality of alkali containing glasses. The fraction x represents the proportion of the alkali metal content which is $K_2O$ and the fraction $(1-x)$ represents the proportion of the alkali metal content which is $Na_2O$.

Referring to FIG. 1, the bold portions of the straight lines are determinative for the ion profiles (and thus the refractive index profiles) resulting from ion exchange processes such as the diffusion occurring in the double crucible process. The least mobile ion constitutes the limiting factor in such processes.

The core-cladding combination of arbitrarily chosen combinations A and C have a mutual refractive index difference $\Delta n_1$. Since electric neutrality must be maintained during the diffusion process it holds that for each $Na^+$ ion which, coming from the core, passes the interface an $K^+$ ion must diffuse, into the opposite direction, from the cladding through the interface into the core. This causes inter alia the composition at the interface to be approximately the average of the compositions of core and cladding glasses (composition $G_1$). The depth to which the $K^+$ ions have penetrated after a certain diffusion time into the $Na^+$ rich core glass is largely determined by the value of $D_K$, the diffusion constant for the $K^+$ ions in composition A. On their way through the interface to their ultimate position the $K^+$ ions indeed proceed through all the compositions located between $G_1$ and A but the layer of the composition A constitutes the highest diffusion resistance and its influence will therefore be dominant. For similar reasons the depth of penetration of the $Na^+$ ions into the cladding is mainly determined by the value of $D_{Na}$ in composition C.

FIG. 1 shows that $D_K$ in A is considerably smaller than $D_{Na}$ in C, which means that the penetration of $K^+$ into the core proceeds slower than the penetration of $Na^+$ into the cladding. The result is that an asymmetrical refractive index profile occurs having a relatively sharp peak in the core and long tails in the cladding (e.g. FIG. 2). The profile deviates very considerably from a parabolic profile.

For the composition pair BE, B for the core glass, and E for the cladding glass between which there is a refractive index difference $\Delta n_2$, the depths of penetration into the core and the cladding are determined by $D_K$ in B and $D_{Na}$ in E, respectively. The value of $D_K$ has now become considerably greater than that of $D_{Na}$, which results in a refractive index profile having a rounder top and only a short tail in the cladding. This approximates a parabolic profile very satisfactorily. The refractive index difference between the core and the cladding glass is substantially the same as for the AC pair ($\Delta n_1 \sim \Delta n_2$). In this case the composition at the interface is $G_2$.

Figures 2, 3:
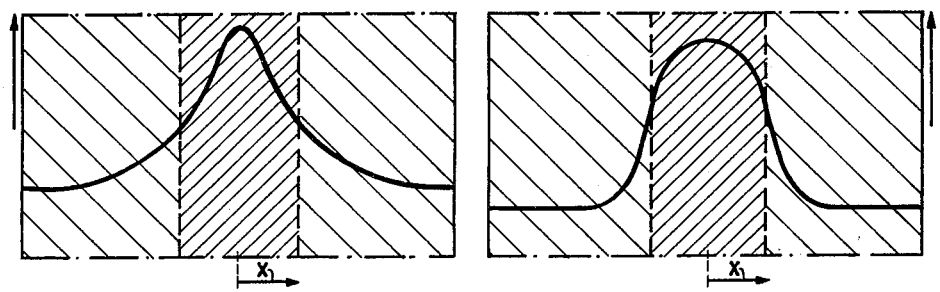
FIGS. 2 and 3 show the refractive index profiles of optical fibers, FIG. 3 showing the profile of a fiber according to the present invention.

A refractive index profile as shown in FIG. 2 is obtained by means of, for example, the following pair of compositions (given in mole %).

|  | Core | Cladding |
| --- | --- | --- |
| $SiO_2$ | 43.95 | 48.45 |
| $GeO_2$ | 29 | 28.5 |
| $Al_2O_3$ | 2 | — |
| CaO | 10 | 8 |
| $Na_2O$ | 15 | — |
| $K_2O$ | — | 15 |
| $As_2O_3$ | 0.05 | 0.05 |

The profile shown in FIG. 3 is obtained, for example, with the following pair of compositions (given in mole %):

|  | Core | Cladding |
| --- | --- | --- |
| $SiO_2$ | 43.95 | 48.45 |
| $GeO_2$ | 29 | 28.5 |
| $Al_2O_3$ | 2 | — |
| CaO | 10 | 8 |
| $Na_2O$ | 14 | — |
| $K_2O$ | 1 | 15 |
| $As_2O_3$ | 0.05 | 0.05 |

What is claimed is:

1. A method of producing a glass fiber containing an alkali metal oxide and having a graded refractive index profile, said method being of the type wherein a core glass, having an initial composition containing a first type of alkali metal ions, and a cladding glass, having an initial composition containing a second type of different alkali metal ions, are contacted and heated to cause diffusion of the two types of alkali metal ions therein, thereby resulting in an alkali metal ion exchange between the core glass and the cladding glass, CHARACTERIZED IN THAT in the initial core glass composition prior to diffusion part of the first type of alkali metal ions are equimolarly replaced by alkali metal ions of the second type in an amount such that after diffusion a fiber having a substantially parabolic refractive index profile is obtained.

2. A method as claimed in claim 1, wherein the first type of alkali metal ion is sodium and the second type of alkali metal ion is potassium.

3. A method as claimed in claim 2, wherein each of the core and cladding initially comprises approximately 15 mole percent alkali metal ions.

4. A method as claimed in claim 1, 2, or 3, wherein the first type of alkali metal ions cause the glass composition to have a higher refractive index than the second type of alkali metal ions.

* * * * *